INVENTORS
Donald F. Durso
Lawrence R. Parks
John R. Goode, Jr.

ATTORNEY's

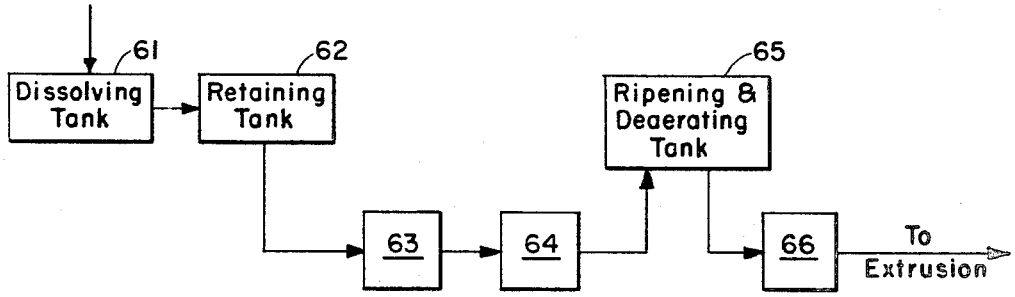
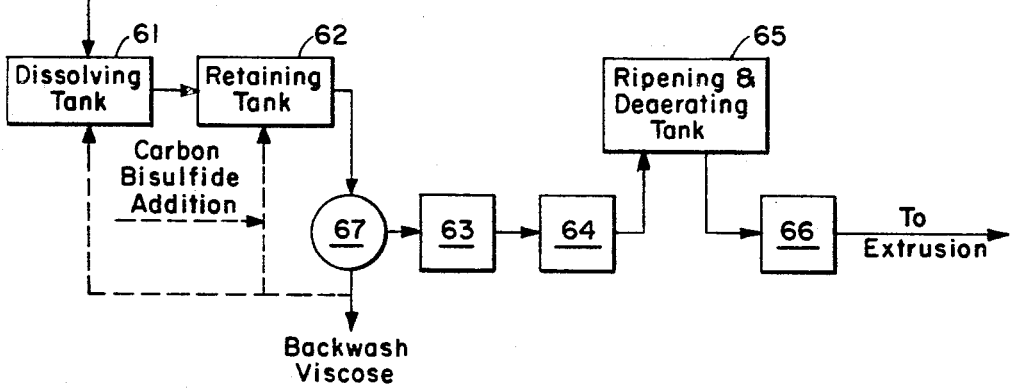
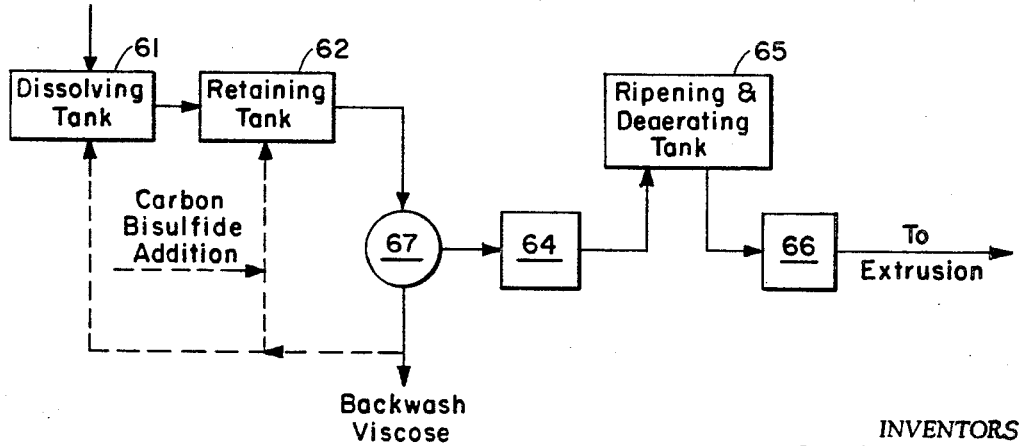

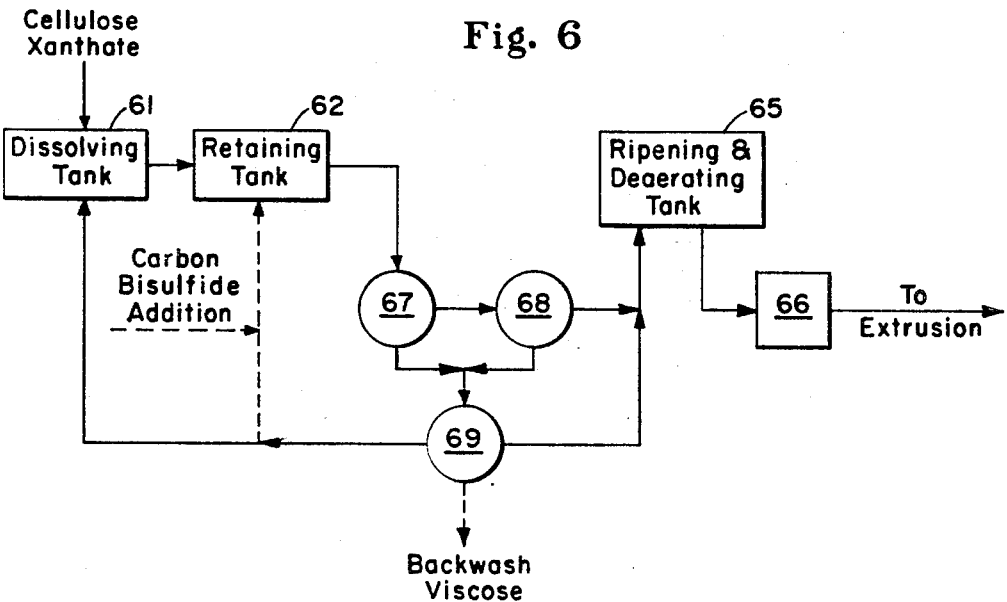
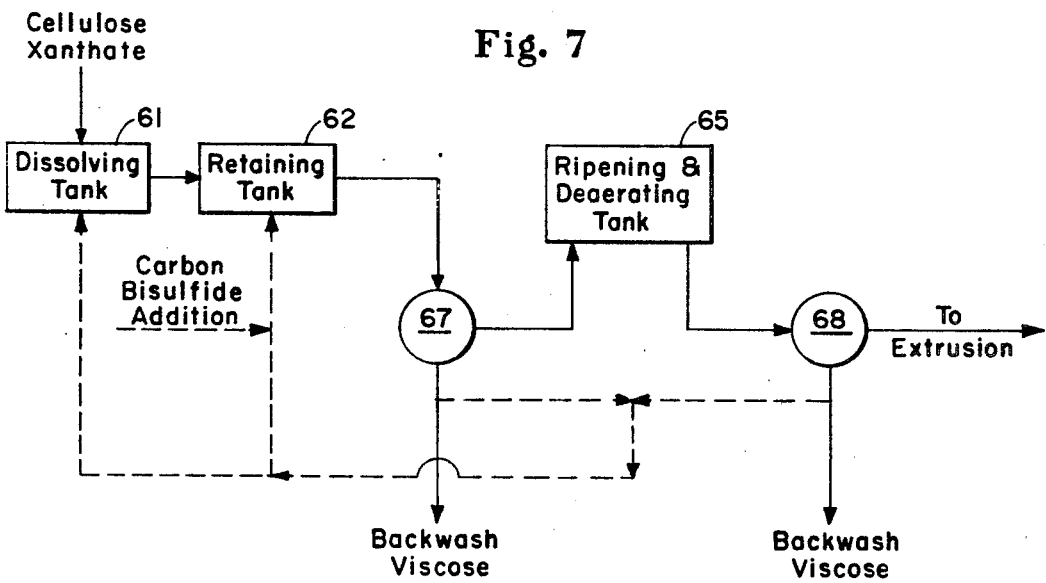

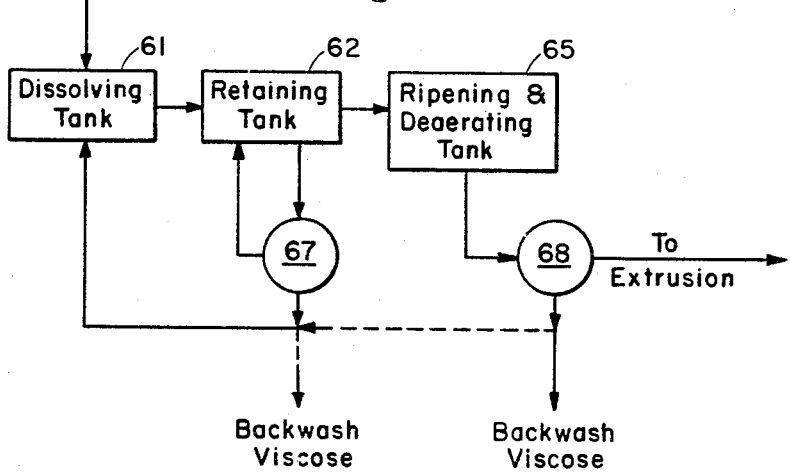
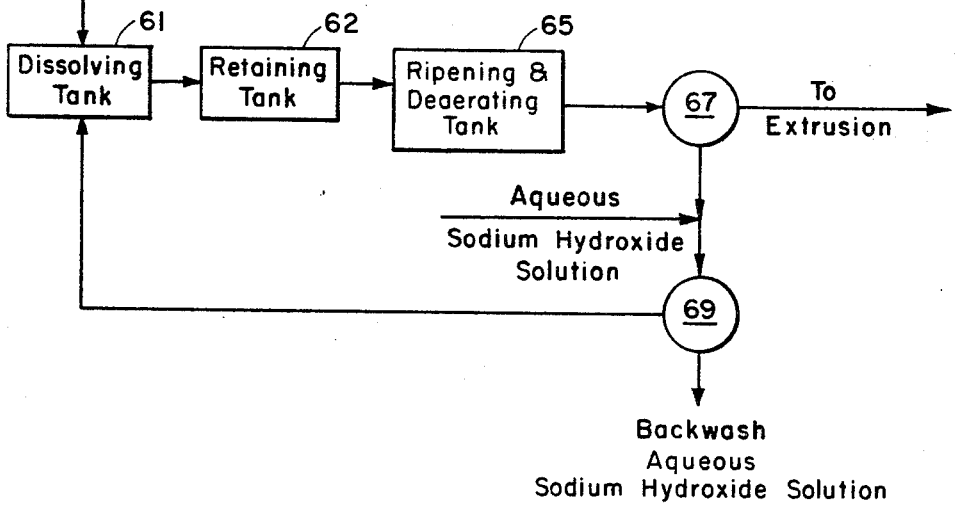

United States Patent Office 3,393,262
Patented July 16, 1968

3,393,262
REMOVAL OF GELS AND SMALL PARTICLES
FROM VISCOSE
Donald F. Durso, Lawrence R. Parks, and John Ronald Goode, Jr., Memphis, Tenn., assignors to The Buckeye Cellulose Corporation, Cincinnati, Ohio, a corporation of Ohio
Filed July 7, 1965, Ser. No. 470,056
16 Claims. (Cl. 264—188)

ABSTRACT OF THE DISCLOSURE

A process for the filtration of viscose through a continuously backwashable filter wherein the foraminous filter media is backwashed with a minor portion of the filtered viscose, and the pressure differential across the continuously backwashable filter media is thereby prevented from exceeding a pre-determined level. The filtered viscose is spun through viscose spinnerets to produce a quality of viscose filament equal to or better than that obtained with conventionally clothed plate and frame filter press filtration.

---

This invention relates to the production of rayon fibers and films from viscose. More particularly, the invention is concerned with the provision of novel filtration sequences for the removal of gels and small particles from viscose prior to extruding the viscose to form rayon fibers, films or shaped articles.

Specifically, the invention comprises improved filtration sequences for viscose which are effected prior to extrusion of the viscose through orifices and which comprise filtering the viscose through at least one backwashable filter clothed with a foraminous filter media, whereby the quality of the extruded product is maintained and the extrusion orifices remain open. The backwashing of said backwashable filter is effected with a minor portion of the filtered viscose at least to the extent that the pressure differential across said foraminous filter media does not exceed a predetermined level. The necessary pressure for backwashing said foraminous filter media is derived from the pressure of the filtered viscose and the backwashing pressure differential across said foraminous filter media and the particulate material deposited thereon can be independently regulated with respect to the pressure differential employed in the initial viscose filtration.

The extrusion of viscose into useful forms such as fibers and films is accomplished by passing the viscose through orifices and slits of selected size prior to coagulating and regenerating the cellulose contained in the viscose. Conventional orifices used for extruding viscose to form fibers and filaments have diameters in the range of about 35 microns to about 80 microns. The conventional slits used for extruding viscose into cellophane films have narrow openings in the range of about 100 orifices and slits used to extrude viscose makes it necessary to filter the viscose to remove gels, skins, fiber fragments and other small particles from the viscose prior to extrusion to prevent weak spots or discontinuities in the extruded products. Even where the size of the particles removed from the viscose is substantially smaller than the limiting size of the extrusion orifice or slit, the strength, appearance and surface smoothness of the final regenerated cellulose products are enhanced by filtration prior to extrusion.

The conventional method of accomplishing the required filtration is to pass the viscose through one or more stages of plate and frame filter presses clothed with cotton domestic, cotton batting, cotton flannel or other woven or non-woven fibrous filter media. Recent innovations in the art directed to the filtration of viscose have tended toward clothing plate and frame filter presses in a filtration series with woven or non-woven fibrous filter media in successive steps of decreasing pore size.

The improvements made in viscose filtration have generally been in the area of providing more satisfactory woven and non-woven fibrous filter media for clothing the plate and frame filter presses. U.S. 3,073,815, issued to Lionel E. Dotson on Jan. 15, 1963, for example, discloses the use of a particular type of paper makers' felt as clothing for the conventional plate and frame filter presses. The disclosed paper makers' felt is comprised of synthetic fibers which withstand chemical attack, so that the filter media can be cleaned in place by successive applications of (1) backward air pressure, (2) backward aqueous sodium hydroxide wash, (3) forward water wash and (4) backward air pressure, when they become plugged with the small particles and gels filtered from viscose.

Notwithstanding such innovations, plate and frame filters require comparatively large amounts of labor to operate and have a large retention volume, so that comparatively large amounts of viscose, i.e. about 1% by weight or more of the viscose filtered, are lost when filter cleaning or reclothing becomes necessary, whereas applicants have found that the objectionable gels and small particles in viscose constitute only about 0.02% by weight of the viscose. Also, relatively large areas of expensive filter media, which are later discarded, are required to clothe the plate and frame filter presses.

In addition to the foregoing problems, conventional plate and frame filter operation inevitably results in a viscose filtrate of variable quality for extrusion. This variable quality results from the fact that a plate and frame filtration cycle begins with clean filter media (high throughput and low pressure differential across the filter media) and continues until the pore openings of the filter media are clogged (low throughput and high pressure differential across the filter media). Under conditions of relatively high pressure differential across the filter media the deformable particles in unfiltered viscose are forced through filter media openings having a smaller apparent size than the deformable particles. Also, the accumulated particles already collected by the filter media are forced through in their entirety, or broken up to appear as smaller particles in the filtered viscose. When cleaning and reclothing becomes necessary, the plate and frame filters are opened, allowing air to enter the system; the time delay under this condition of atmospheric exposure is conducive to the formation of gels and viscose "skins" in the filtering equipment and its connecting lines. These gels and viscose "skins" either contribute to the clogging of the filter media during the succeeding filtration cycle or pass through the filtration media to cause variable quality in the extruded fiber and film products.

The principal object of this invention is to minimize or eliminate the foregoing detrimental features by providing novel filtration sequences for viscose in which at least one sage of filtration is carried out by passing the viscose through a filter media mounted in a continuously backwashable filter of a type wherein filtered viscose is used as the backwashing media, the backwashing pressure is derived from the pressure of the filtered viscose and the backwashing pressure differential across the wire screen and the particulate material deposited thereon can be independently regulated with respect to the pressure differential employed in filtering the viscose.

A further object is to provide preferred filtration sequences for viscose in which at least one continuously backwashable filter is used to extend the filtration life of a conventionally clothed plate and frame filter press placed subsequent to the continuously backwashable filter in the filtration sequence.

A still further object is to provide a preferred filtration stage for viscose wherein the pressure drop across the filter media is maintained at a relatively low and stable value in a closed pressure system to result in a viscose filtration cycle having a substantially lengthened period.

Another object is to provide preferred viscose filtration sequences wherein the loss of viscose is minimized and the tendency of filtration media to convert the larger particles in viscose into smaller particles capable of passing through the filter media is decreased by maintaining a relatively low pressure drop across the filter media.

Finally an object of this invention is to provide a preferred method for the filtration of viscose wherein the required and desirable degree of filtration is accomplished by passing the viscose through viscose filtration sequences composed exclusively of the aforementioned type of continuously backwashable filter.

The invention consists of a filtration sequence, to be hereinafter described and claimed, for carrying out the above stated objects, and such other objects, as will become apparent from the following description of preferred embodiments of the invention, illustrated with reference to the accompanying drawings and using identical identifying numbers to refer to the same features, wherein:

FIGURE 3 is a flow chart of a viscose filtration system according to conventional practice;

FIGURES 4, 5, 6, 7, 8 and 9 are flow charts of particularly advantageous embodiments of the viscose filtration sequences of the present invention, wherein movement of the viscose is effected by pumps or air pressure according to conventional practice in the viscose industry.

Figure 1:
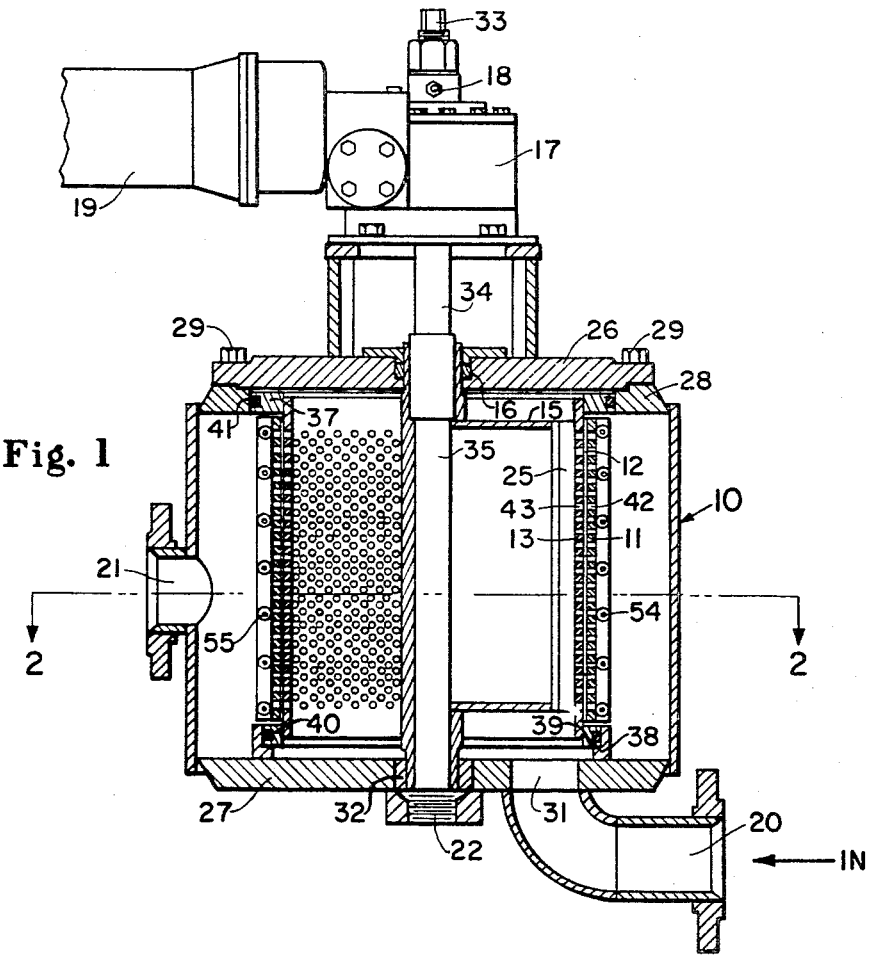
FIGURE 1 is an elevational cross sectional view of a particularly suitable embodiment of a continuously backwashable strainer or filter to be used in the viscose filtration sequences of this invention.
Figure 2:
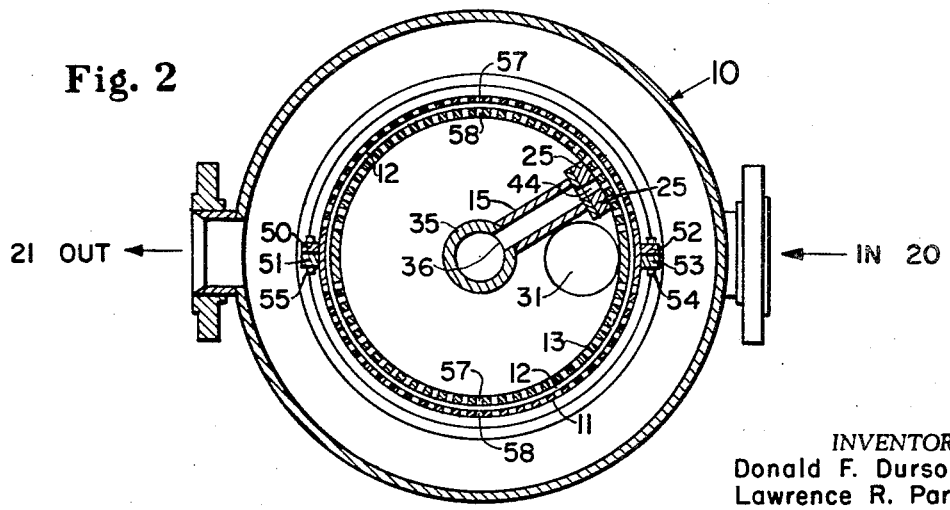
FIGURE 2 is a cross sectional view of the continuously backwashable filter of FIGURE 1 taken on line 2—2.

Referring now to the drawings, and in particular to FIGURES 1 and 2, there is illustrated a particularly advantageous continuously backwashable filter for use in the present viscose filtration sequences.

The continuously backwashable filter or strainer shown in FIGURES 1 and 2, manufactured by Zurn Industries, Inc., of Erie, Pa., and sold under the trademark Strain-O-Matic, Model 595A, has a hollow body which is made from a generally cylindrical outer shell 10 closed at its top by the cover 26 and closed at its bottom by the header 27. The header 27 is welded to the outer shell 10 around the inner periphery thereof in a well-known manner. The cover 26 is supported on ring 28 and is attached to the ring 28 by means of studs 29. The header 27 has an inlet opening 31 therein which communicates with the inside of the strainer adjacent one side of the strainer body and is connected to an inlet pipe 20. The shell has an outlet opening 21 therein which is connected to a suitably flanged pipe whereby it is connected in a flow line.

The header 27 has an opening in the center that is connected to the backwash outlet fitting 22. A bearing 32 is fitted into this opening and the bearing 32 receives the lower end of the shaft 35.

The cover 26 has packing in a central opening therein with suitable packing gland 16 through which the shaft 35 of the backwash arm 15 extends. Although only one backwash arm 15 is shown in FIGURES 1 and 2, the shaft 35 can be equipped with multiple backwash arms. For example, shaft 35 can be provided with two backwash arms 15 mounted at 180 degrees from each other. The backwash arm 15 is supported by a bearing in the speed reducer 17 and driven by the motor 19 through the speed reducer 17 and keyed thereto by means of a shear pin 18. The vertical thrust of the shaft 34 as well as lateral support for the upper end is provided by speed reducer 17.

In case of a power failure or other emergency condition, the pin 18 can be removed and an operator can attach a suitable wrench to the non-circular end 33 which is directly connected to the shaft 35. The lower end of the shaft 35 indicated is hollow and communicates with the backwash outlet 22. Shaft 35 has a slot 36 in one side at an intermediate position. Slot 36 is connected to the backwash arm 15. Suitable packings are provided at 16 and at 32.

The top of the strainer cage is supported in the body by means of a ring 37 and the bottom is supported in a ring 38. The ring 38 is L-shaped in cross section and is welded to the header 27 so that it presents an annular seat 39. The seat 39 receives the ring 40 which is welded to the outer periphery of the inner cage 13. It will be noted that the inner cage 13 is longer than the outer cage 11 and the ends of inner cage 13 extend above and below it. The ring 40 has an O-ring seal therein which forms sealing engagement between the ring 40 and the ring 38.

The outer periphery of the upper end of the inner cage is welded to the ring 37 and the ring 37 has an O-ring 41 in a suitable groove which makes sealing engagement with the inner periphery of ring 28.

The strainer basket is made up of the hollow cylindrical inner cage 13 and the hollow cylindrical outer cage 11 that sandwich the mesh straining element 12 therebetween. The inner cage and outer cage have holes 43 and 42 respectively that align with each other so that a segment of wire screen straining mesh or filter media 12 is exposed in each hole. This will be more completely described hereinafter.

It will be noted that the lower ring 40 is smaller than the upper ring 37 so that the strainer can be readily removed by removing the cover 26 and lifting the entire strainer basket out.

The backwash arm 15 has the shoes 25 attached to its outer end. The shoes 25 are spaced from each other and provide a space 44 therebetween. Thus, when the backwash arm 15 is swung around its axis, which is coaxial with the central axis of the strainer, the shoes 25 move in contact with the inside periphery of the inner cage, and the space 44 provides a lower pressure area on the inner periphery of the inner cage to receive particles of material which have been strained out of the liquid on the upstream side of the straining mesh. Since the liquid on the downstream side of the straining mesh will have a higher pressure than the pressure in the space 44, liquid will flow through the straining element in a reverse direction; that is, from the outside of the screen to the inside of space 44 and into the backwash arm 15, thereby carrying the material that has been trapped in the holes 43 and on the screen straining mesh or wire screen filter media 12 into the backwash arm 15 and out fitting 22.

Applicants have found that wire screen filter media having mesh frequencies between about 200 and about 800 meshes per inch with respective mesh openings of about 74 to about 17 microns will strain out particles that would be deleterious to subsequent filtration media in a viscose filtration sequence, to the subsequent spinning system or to the quality of the resulting fibers and films. It has also been found that a continuously backwashable screen is necessary to maintain continuous viscose flow through an effective foraminous filter media and that a continuously backwashable strainer as described above is particularly adapted to use in the viscose filtration sequences of this invention.

The rotational speed of the backwash arm 15 can be controlled to maintain a maximum or set pressure differential across the wire screen filter media for optimum viscose filtration. A higher rotational speed will minimize the pressure differential. Applicants contemplate that continuous backwash refers to a backwash whereby the screen strainer media is maintained sufficiently clear so that the viscose filtration differential pressure does not exceed, for example, 50 p.s.i.g. For example, the backwash arm 15 can be rotated slowly and continuously to result in a substantially constant pressure differential across the wire screen filter media. It is also contemplated by applicants that the described continuously backwashable strainer mechanism can be made to operate effectively by rotating the backwash arm 15 for at least one complete revolution whenever the differential pressure reaches a set maximum, for example, 50 p.s.i.g. This intermittent operation can be accomplished by the use of a pressure switch connected to the backwash arm rotating motor 19, or by manual rotation of the backwash arm 15 when an operator notes a pressure rise to the set maximum.

The slot defined at 44 in the backwash arm 15 can be, for example, between one-sixteenth inch wide and two inches wide, but preferably the slot 44 is of a width to cover one vertical row of holes 43. The shoes 25 are preferably wide enough to prevent leakage of the viscose from the interior of the strainer basket into the backwash arm 15. In order to provide effective sealing, the shoes 25 can be faced with a resilient material, for example, polytetrafluoroethylene (Teflon), polyoxy methylene resin (Delrin), polyethylene, polypropylene, etc., and are operated in contact with the inner periphery of the inner shell 13 of the cage.

The holes 43, in which the particulate matter filtered from the viscose is collected, can be about 1/16 inch to about 1/2 inch, preferably about 1/4 inch in diameter. The inner shell 13 of the cage must be of sufficient thickness to provide mechanical integrity and volume for the collection of particulate matter. It is preferred that the ratio of open to closed area in inner cage 13 and outer cage 11 be as large as possible, commensurate with the assurance of structural strength in the drilled cages.

The strainer basket disclosed herein can be made by the following method to perform the required function. The inner cage is made by providing a hollow cylindrical member which has an outside diameter slightly greater than the desired diameter of the finished inner cage 13. The inner cage is then welded at its lower end to the ring 40 and at its upper end to ring 37 and all surfaces are rough machined to remove scale and weld spatter. The inner cage 13 is then heat treated to relieve all internal stresses. All surfaces of the inner cage 13 are then accurately machined to the proper finished dimension and shape.

A second hollow cylindrical member is then provided to form the outer cage 11 and this hollow cylindrical member is rough machined inside and out to remove scale. The vertical flanges 50, 51, 52 and 53 are then welded in place to the outer hollow cylindrical member and the assembly is stress relieved. The inner periphery of the outer cage is machined to a finish dimension which is sufficient to give a clearance space between the inner and outer cage sufficient for the strainer element 12. That is, the inside diameter of the outer cage 11 will be an amount greater than the outside diameter of the inner cage 13 equal to twice the approximate thickness of the straining element 12. The outer cage 11 is then split axially between the flanges 50 and 51 and between the flanges 52 and 53 to provide two separate halves of the cage.

The outer periphery of the inner cage 13 is then wrapped with a shim material having a thickness approximately equal to the thickness of the strainer element 12, and the outer cage 11 is placed therearound and bolts 54 and 55 are put in place and tightened. Multiple holes 42 and 43 are then drilled and deburred. Two holes 57 and 58 are then reamed out and a locating dowel is put therethrough approximately half way between the flanges 50, 51, 52 and 53.

The bolts 54 and 55 are then removed, the shim taken out, and the straining element 12 assembled between the outer and inner cages. The straining element 12 is assembled by laying the straining element over the outside circumference of the inside shell after removing the outer cage, and then putting the outer cage halves over the screen, taking care not to damage the straining element. Bolts 54 and 55 are then inserted. The cage assembly is then ready to assemble in the strainer as shown in FIGURES 1 and 2.

Referring to FIGURE 3, the well-known viscose process for the production of rayon, beginning with alkali cellulose, proceeds through the steps of xanthating alkali cellulose by reaction with carbon bisulfide and dissolving the resulting cellulose xanthate in dilute aqueous sodium hydroxide to the steps of filtering, ripening, deaerating and extruding the resulting viscose. The viscose in the extruded article is then coagulated, and the cellulose contained in the viscose is regenerated. FIGURE 3 illustrates a conventional viscose filtration sequence wherein viscose is prepared by dissolving cellulose xanthate in dilute sodium hydroxide in the dissolving tank 61 and thereafter flows to the retaining tank 62. The viscose is then filtered through conventional plate and frame filter presses 63 and 64, is piped to the ripening and deaerating tank 65 and thereafter is filtered through conventional plate and frame filter press 66 immediately prior to extrusion. Filter presses 63, 64, 66 are clothed with, for example, non-woven multi-layer cotton batting, although varied types of cloths, felts and filter papers are conventionally employed as clothing in viscose filter press sequences.

Referring to FIGURE 4, a continuously backwashable filter 67 of the type described hereinbefore and preferably like the continuously backwashable filter illustrated in FIGURES 1 and 2 is inserted between the retaining tank 62 and the first filter press 63 in the viscose filtration sequence illustrated in FIGURE 3. The continuously backwashable filter 67 is clothed with stainless steel screen having a minimum mesh frequency of 200 meshes per inch and screen openings with a maximum size of 74 microns. The backwash arm can be rotated, for example, at a speed between about 0.02 r.p.m. and about 10 r.p.m. for a wire screen filter media mounted on a strainer basket about 22 inches in diameter. The rate of backwash rotation will be dependent on the particular mesh opening size of the wire screen filter media in use, the viscose flow rate through the filter, the particle loading of a particular viscose, the maximum allowable pressure differential for filtration, the use of continuous or intermittent backwash arm rotation, etc. The volume of backwash viscose must be at least 1.1 times the volume of the holes 43 (taking into account the thickness of inner cage 13) adjacent the space 44 during each revolution of the backwash arm 15, and it has been found that a backwash pressure differential across the wire screen filter media and the particulate matter deposited thereon of about 2 p.s.i. to about 30 p.s.i. is sufficient to dislodge the particulate matter from the wire screen filter media and eject it from the holes 43 into space 44. Backwash pressure differentials of about 15 p.s.i. to about 17 p.s.i. are preferred when the backwash arm 15 is operated intermittently; the lower backwash pressure differentials are more suitable for continuous backwash arm rotation. The backwash pressure differential must be sufficient to dislodge the particulate matter from holes 43, but higher backwash pressures result in the use of excessive amounts of backwash viscose. The amount of backwash viscose used and the backwashing pressure differential across the stainless steel wire screen filter media and the particulate material deposited thereon is regulated by throttling the discharge of backwash viscose from backwash arm 15. The maximum necessary backwash arm rotating speed can be readily determined in operation by increasing the speed of rotation until the pressure differential of the viscose filtration is reduced to a fixed minimum. The minimum rotating speed is that which maintains a level trend in the filtration pressure differential, even though a graphic plotting of the pressure differential versus time may take a sawtooth shape. Applicants have found, for example, that, with a relatively clean viscose passing through about 5 square feet of stainless steel wire screen filter media mounted in the described continuously backwashable filter, a single 1.7 r.p.m. to 3.5 r.p.m., preferably 3 r.p.m., revolution of the backwash arm after the filtration of about 4000 pounds of viscose will maintain the pressure differential of the filtration below 50 p.s.i.g. in a sawtooth curve. Filtration rates of about 40 pounds of viscose per square foot of wire screen filter media area per minute are preferred, and filtration rates between about 10 and about 120 pounds of viscose per square foot of wire screen filter media area per minute can be achieved. The backwash viscose is shown as discarded in the viscose filtration sequence of FIGURE 4, although alternate recycling to dissolving tank 61 or retaining tank 62 is illustrated by dashed lines in FIGURES 4, 5, 6 and 7 and more fully explained in describing the viscose filtration sequence illustrated in FIGURE 6.

Referring to FIGURE 5, a continuously backwashable filter 67 of the type described hereinbefore and preferably like the continuously backwashable filter illustrated in FIGURES 1 and 2 is substituted for filter press 63 in the viscose filtration sequence shown in FIGURE 3. The continuously backwashable filter 67 in FIGURE 4 is clothed with a stainless steel wire screen filter media having a minimum mesh frequency of about 200 meshes per inch and screen openings with a maximum dimension of 74 microns. The rotational speed of the backwash arm in the continuously backwashable filter 67 in the viscose filtration sequence of FIGURE 5 is determined as was the rotational speed of the continuously backwashable filter in the filtration sequence illustrated in FIGURE 4.

Referring to FIGURE 6, continuously backwashable filters 67, 68 of the type described hereinbefore and preferably like the continuously backwashable filter illustrated in FIGURES 1 and 2 are substituted for filter presses 63 and 64 in the filtration sequence illustrated in FIGURE 3. The successive continuously backwashable filters 67, 68 in FIGURE 6 are clothed respectively with stainless steel wire screen filter media having a minimum mesh frequency of about 200 meshes per inch and screen openings with a maximum dimension of 74 microns and stainless steel wire screen filter media having a minimum mesh frequency of about 325 meshes per inch and screen openings with a maximum dimension of about 44 microns to constitute a closed pressure system for the filtration of viscose. A closed pressure system for the filtration of viscose avoids the problems of coagulation caused by contacting viscose with the oxygen in air. The rotational speeds of the backwash arms in the continuously backwashable filters 67, 68 in the viscose filtration sequence of FIGURE 6 are determined as for the continuously backwashable filter inserted in the filtration sequence illustrated in FIGURE 4.

A third continuously backwashable filter 69, clothed with a stainless steel wire screen filter media having a maximum screen opening dimension equal to or less than the wire screen used to clothe the last successive continuously backwashable filter 68, can be employed in the filtration sequence of FIGURE 6 to filter the viscose used in backwashing the two continuously backwashable filters 67, 68 placed directly in the viscose filtration sequence. The continuously backwashable filter 69 minimizes viscose loss by refiltering the backwash viscose from the two continuously backwashable filters 67, 68 in the viscose filtration sequence. The gels and particles removed from the backwash viscose can be returned to the dissolving tank 61 or to the retaining tank 62 with the addition of carbon bisulfide as shown by the dotted lines in FIGURE 6. Applicants have found that the cellulose xanthate entering dissolving tank 61 contains sufficient excess carbon bisulfide to result in the rexanthation and dissolving of a major portion of the particulate matter in the recycled backwash viscose. If it is desirable to return the backwash viscose to retaining tank 62, the addition of about 0.5% by weight of carbon bisulfide, based on the weight of backwash viscose, has been found to be beneficial.

The filtered viscose from continuously backwashable filters 68 and 69 is directed to the ripening and deaerating tank 65. A single continuously backwashable filter can use about 0.3%, or less, of the viscose passing through it for effective backwashing. When the above-mentioned amount of viscose is used for backwashing, the viscose loss in the system illustrated in FIGURE 6 where the backwashing viscose from continuously backwashable filters 67, 68 is passed through continuously backwashable filter 69 and the backwashing viscose is discarded, can be less than 0.1% of the viscose passing through the entire filtration sequence. Where the backwashing viscose from continuously backwashable filter 69 is recycled to either the dissolving tank 61 or the retaining tank 62, the loss will be reduced to the necessary ultimate bleed of insoluble materials from the system. The continuously backwashable filter 69 used to filter the backwash viscose from the continuously backwashable filters 67, 68 placed directly in the viscose filtration sequence can be piped to filter the backwash viscose from several continuously backwashable filters in a viscose filtration sequence. In the viscose filtration system illustrated in FIGURE 6, a continuously backwashable filter clothed with a stainless steel wire screen filter media having a minimum mesh frequency of about 400 meshes per inch and screen openings with a maximum dimension of about 36 microns can be substituted for the filter press 66. In this mode of operation, the second continuously backwashable strainer 68 is clothed with a stainless steel wire screen filter media having a minimum mesh frequency of about 400 meshes per inch and screen openings with a maximum dimension of about 36 microns.

Referring to FIGURE 7, a viscose filtration sequence employing only two continuously backwashable filters 67, 68 in sequence is illustrated. In this viscose filtration sequence, the continuously backwashable filters 67, 68 are clothed with stainless steel wire screen filter media having respective minimum mesh frequencies of about 325 and about 500 meshes per inch together with respective mesh openings having maximum dimensions of about 44 microns and about 28 microns. A variation of the viscose filtration sequence illustrated in FIGURE 7 can employ only the one continuously backwashable filter 68. In this viscose filtration sequence the viscose passes directly from retaining tank 62 to ripening and deaerating tank 65, and the continuously backwashable filter 68 is clothed with a stainless steel wire screen filter media having a minimum mesh frequency of about 550 meshes per inch and screen openings having a maximum dimension of about 26 microns.

Referring to FIGURE 8, a viscose filtration sequence which uses two continuously backwashable filters 67, 68 is illustrated. In this viscose filtration sequence, the continuously backwashable filters 67, 68 are clothed with stainless steel wire screen filter media having respective minimum mesh frequencies of about 325 and about 500 meshes per inch together with respective maximum mesh openings of about 44 microns and about 28 microns. Viscose is circulated from retaining tank 62 through continuously backwashable filter 67 and back to retaining tank 62. During periods of viscose extrusion, the prefiltered viscose in retaining tank 62 flows into ripening and deaerating tank 65 and thereafter through continuously backwashable filter 68 to extrusion. As illustrated in FIGURE 8, the backwash viscose from continuously backwashable filter 67 can be returned to dissolving tank 61 or, alternatively, discarded. The backwash viscose from continuously backwashable filter 68 can be discarded or, alternatively, returned to dissolving tank 61.

Referring now to FIGURE 9, a viscose filtration system employing two continuously backwashable filters 67, 69 is illustrated. In the viscose filtration sequence illustrated, the continuously backwashable filters 67, 69 are clothed with stainless steel wire screen filter media having a minimum mesh frequency of about 500 meshes per inch together with mesh openings having a maximum dimension of about 28 microns.

In the viscose filtration sequence illustrated in FIGURE 9, the viscose from dissolving tank 61 flows to retaining tank 62 and thereafter to ripening and deaerating tank 65 prior to being filtered through continuously backwashable filter 67. The filtered viscose from continuously backwashable filter 67 goes to extrusion, while the backwash viscose from continuously backwashable filter 67 is diluted with dilute aqueous sodium hydroxide solution and filtered by continuously backwashable filter 69. The diluted and filtered viscose from continuously backwashable filter 69 is returned to dissolving tank 61, while the backwash solution from continuously backwashable filter 69, containing substantially only the insoluble material from the initial viscose and dilute aqueous sodium hydroxide, is discarded. The viscose filtration sequence illustrated in FIGURE 9 results in a reduced viscose loss which closely approaches the ultimate loss of the insoluble particles in the initial viscose.

In the preferred practice of the viscose filtration sequences of this invention, the viscose is filtered through a system of one or more continuously backwashable filters equipped with stainless steel wire screen filter media, although screen filter media prepared from other metal unaffected by chemical action will be found equally suitable. Other foraminous filter media than stainless steel wire screen filter media, for example, perforated sheets of stainless steel, polyethylene or Teflon, having maximum opening sizes equivalent to those stated herein can also be used as filter media. When perforated filter media are used, backwashing is improved by making the perforations in the shape of truncated cones with their larger diameters facing the backwash arm. Applicants have discovered, however, that woven screen filter media prepared from relatively soft and yieldable materials such as polyethylene filament are relatively unsatisfactory for use as filter media in the present viscose filtration sequences. This is surprising in view of the usefulness of perforated sheets of the same materials.

As stated before, the stainless steel wire screen filter media useful in the practice of the present invention have mesh frequencies between about 200 to about 800 meshes per inch and mesh openings having maximum dimensions between about 74 and about 17 microns. The wire screen filter media may be any conventional weave, for example, plain weave, double crimp weave, twilled weave and dutch weave. In a viscose filtration system using a single continuously backwashable filter, a stainless steel wire screen filter media having a maximum mesh opening of about 17 microns is desirable to accomplish the required filtration to prevent spinneret plugging and to result in a smooth rayon tow when spinning with a spinneret having 35 micron diameter holes. Wire screen filter media having higher mesh frequencies than 800 and mesh openings having maximum dimensions less than 17 microns can be used in the present viscose filtration sequences, but are not preferred due to their increased fragility and cost.

In the systems where one or more continuously backwashable filters are used ahead of conventional plate and frame filter presses, a continuously backwashable filter equipped with a stainless steel wire screen filter media having a minimum mesh frequency of about 325 meshes per inch and mesh openings having maximum dimensions of about 44 microns has been found effective in extending the service life of conventional filter clothing. In conventional viscose filtration systems using only plate and frame filter systems, the clothing is discarded when the differential pressure required to maintain a selected viscose flow rate, rises to a selected maximum where pumping costs make continuation of the filtration uneconomical. The use of a continuously backwashable filter equipped with a 325 mesh per inch, 44 micron opening stainless steel wire screen filter media has been found to increase the service life of conventional filter media by a factor of about 1.8.

It has been found possible to repeatedly backwash a stainless steel screen mounted in a single continuously backwashable filter to its initial differential pressure with about 0.2% to about 1.0% by weight of the viscose directed to the filter, although a complete backwash is unnecessary or even undesirable due to the prefiltering action of a slight amount of remaining particulate material. As illustrated in FIGURE 6 additional backwash filters and recycle of the backwash viscose can be used to further reduce the loss of the viscose product. In viscose filtration sequences using continuously backwashable filters exclusively, backwash viscose recycle can reduce the ultimate viscose loss to about 0.04% by weight of the viscose filtered. Since the stainless steel wire screen filter media in such a viscose filtration sequence can be backwashed to their initial differential pressure on each backwash cycle, their service life is without practical limitation.

The following examples are intended to further illustrate the practice and advantages of viscose filtration sequences incorporating a continuously backwashable filter. Since it will be apparent that, once their effectiveness and practicality are realized, continuously backwashable filters, as described in the present application, can be used in many possible viscose filtration sequences, either by themselves or in viscose filtration sequences together with conventionally clothed plate and frame filter presses, applicants intend the following examples to be illustrative and not restrictive of the true scope of the invention as measured by the appended claims.

Example I

Conventional viscose was prepared and converted into rayon filament on a continuous spinning machine. A commercial prehydrolyzed sulfate pine pulp suitable for conversion into textile rayon fibers was used as a raw material for the viscose.

The viscose was prepared by steeping the pulp for one hour in an aqueous solution containing 18% sodium hydroxide by weight in a steeping press. After the pulp sheets were placed in the steeping press, a press filling rate of 2.5 inches per minute was used to introduce the aqueous solution of sodium hydroxide. The pulp was steeped for one hour and then pressed to a 2.6 press weight ratio. After pressing, the resulting alkali cellulose was shredded for 40 minutes with 0.1% of Pluronic L-64, a surface active copolymer of polyethylene oxide and polypropylene oxide marketed by the Wyandotte Chemicals Corporation of Wyandotte, Michigan, based on the weight of cellulose in the alkali cellulose added to the alkali cellulose at the beginning of the shredding period. After shredding, the alkali cellulose was aged for 21 hours at 35° C., and the aged alkali cellulose was then xanthated in a baratte for 100 minutes at 29° C. using 31.2% carbon bisulfide based on the weight of cellulose in the alkali cellulose. The resulting cellulose xanthate was dissolved in a dilute aqueous solution of sodium hydroxide for 90 minutes at 18° C. to form viscose having the following average composition:

|  | Percent |
|---|---|
| Cellulose | 8.07 |
| Alkali | 4.82 |
| Total sulfur | 2.13 |

The viscose was filtered and then ripened to an average salt index of 8.0 by ripening and deaerating for 22 hours at 17° C. The ripened and deareated viscose was then filtered and spun into a bath containing 114 g./l. $H_2SO_4$, 38 g./l. $ZnSO_4$, and 215 g./l. $Na_2SO_4$ at 47° C. The immersion length of the resulting rayon filaments in the spin bath was 20 inches. The yarn was stretched 50% as it passed through a second bath containing 3% $H_2SO_4$ at 95° C. After washing and applying conventional finishing materials, the yarn was dried and collected on a cone winder. A spinning speed of 70 meters per minute was used.

After dissolving and prior to ripening before spinning, the viscose was passed through a continuously backwashable filter clothed with a stainless steel wire screen filter media having a mesh frequency of 325 meshes per inch and screen openings having maximum dimensions of 44 microns. The diameter of the stainless steel wire screen filter element was 22.75 inches, and 5.11 square feet of the stainless steel wire screen filter media was open to viscose flow. A backwash of 0.65% by weight of the total viscose entering the filter, or 2.4 times the volume of the ¼ inch holes 43 in inner cage 13, passed through the backwash arm during one rotation of the backwash arm 15 at the rate of 1.7 r.p.m. per 20 minutes, or every 4000 pounds of viscose, served to limit the differential pressure across the filter screen to 50 p.s.i.g. and to prevent an upward trend in its average. The backwash pressure differential was 18 p.s.i. The viscose from the continuously backwashable filter was passed through two conventional plate and frame filter presses prior to ripening-deaeration and through one conventional plate and frame filter press thereafter. The plate and frame filter presses were clothed with cotton batting, and it was found that the service life of the filter media in the conventional plate and frame filter press following the continuously backwashable filter was increased by a factor of 1.8. The filtered viscose was found to have excellent extrusion characteristics when spun through a 980 hole spinneret having 50 micron diameter holes, and the stainless steel wire screen filter media was judged to have a substantially unlimited continuous filtering life.

Additional viscoses of the same general composition were filtered through viscose filtration sequences as reported above and as outlined in FIGURE 5. The filter characteristics for backwashable filter 67 (First Filter) and plate and frame filter presses 64 and 66 (Second and Third Filter) are reported in the table below. In each of the examples, the filters reported with a mesh filter are backwashable filters. In these further examples, conventional cotton, flannel and batiste filter cloths were used to dress the plate and frame filter presses as indicated in the table below.

TABLE

| Example | First Filter | Second Filter | Third Filter | Spinneret Hole Size, Microns |
|---|---|---|---|---|
| II | 200 mesh | 352 mesh | 450 mesh | 50 |
| III | do | do | 500 mesh | 50 |
| IV | do | 400 mesh | 400 mesh | 50 |
| V | do | do | 450 mesh | 50 |
| VI | do | do | 500 mesh | 50 |
| VII | 325 mesh | 325 mesh | Batiste | 50 |
| VIII | do | Flannel | do | 50 |
| IX | 200 mesh | do | 325 mesh | 50 |
| X | do | do | Batiste | 50 |
| XI | | 325 mesh | 450 mesh | 50 |
| XII | | | 600 mesh | 50 |
| Conventional. | Cellulose pulp. | Flannel | Batiste | 50 |
| XIII | 200 mesh | 400 mesh | do | 61.5 |
| XIV | do | 325 mesh | 400 mesh | 71.5 |
| XV | do | 400 mesh | do | 71.5 |
| XVI | do | 325 mesh | 500 mesh | 71.5 |
| XVII | do | do | Batiste | 71.5 |
| XVIII | 325 mesh | do | 325 mesh | 71.5 |

In the examples reported in the above table, the stainless steel wire screen filter media had the following mesh frequencies and hole sizes:

| Meshes per inch: | Hole size, microns |
|---|---|
| 200 | 74 |
| 325 | 44 |
| 400 | 36 |
| 450 | 32 |
| 500 | 28 |
| 600 | 22 |

In each viscose filtration sequence, as tabulated in the above table, the first and second filters were in sequence between the dissolving and ripening-deaeration stages in the viscose process, and the third filter was located subsequent to the ripening-deaeration stage and just prior to extrusion. The tabulated viscose filtration sequences were found to accomplish the filtration required for viscose to be successfully spun through the size spinneret hole reported in the table. In every instance, the substitution of a tighter filter media for any stage of filtration was found to produce a spinnable viscose.

The backwash arm 15 of the continuously backwashable filter of Example I can also be operated continuously at a speed of 0.044 r.p.m. In this mode of operation the pressure differential between the filtered and unfiltered viscose, across the stainless steel wire screen filter media, will be held nearly constant at about 40 p.s.i. by a backwash of about 0.34% by weight of the total viscose entering the filter, or about 1.8 times the volume of the ¼ inch holes 43 in inner cage 13 per rotation of backwash arm 15. A filtered viscose of excellent spinning quality will be achieved.

As illustrated in FIGURE 7, the viscose filtration system of Example XI composed of only two continuously backwashable filters equipped with successive stainless steel wire screens having mesh frequencies of 325 and 450 meshes per inch together with respective screen opening dimensions of 44 and 32 microns was found to produce a filtered viscose suitable for extrusion through 50 micron spinneret holes. Also, the single continuously backwashable filter of Example XII placed subsequent to the ripening-deaeration tank and just prior to extrusion and equipped with a stainless steel wire screen filter media having a minimum mesh frequency of 600 meshes per inch together with screen openings having a maximum dimension of 22 microns will produce filtered viscose suitable for spinning through 50 micron spinneret holes.

The filtered viscose resulting from the filtration of viscose through the viscose filtration sequences, using at least one continuously backwashable filter, as herein disclosed has been discovered to result in a finished rayon product quality equal or superior to that obtained with viscose filtration systems comprised exclusively of conventional plate and frame filter presses. The spinnability of the viscose is also increased. In the disclosed viscose filtration sequences wherein continuously backwashable filters precede a conventional plate and frame filter press, the life of the plate and frame filter press clothing has been discovered to be increased by a factor of about 1.8. Viscose filtration systems composed exclusively of one or more continuously backwashable filters confer a further benefit in that the continuing nature of the filtration in a closed pressure system at a non-trending pressure differential across the filtering media leads to a constant quality in the filtered viscose and the resulting rayon filaments. This constancy results from the minimization of pressure increases or surges of sufficient magnitude to force gels and other deformable particles in the viscose through the filter media.

In the filter sequences for viscose set forth herein, it is emphasized that an exchange of one of the filter media in a viscose filtration sequence for a filter media having larger size openings is markedly detrimental to the spinning quality associated with a stipulated spinneret hole size. The effect of such an exchange is noted when the filter media is replaced in any stage of a viscose filtration sequence. A viscose is said to have good spinning quality if it does not clog the spinneret holes through which it is extruded and produces a product with a smooth surface feel.

An additional indication of the critical nature of a viscose filtration sequence is obtained from the fact that when any of the filtration sequences found suitable for use with spinnerets having 71.5 and 61.5 micron holes were used with spinnerets having 50 micron holes, spinning quality was markedly worse. Conversely replacement of a spinneret with one having larger holes in spinning viscose from a given filtration system results in improved spinning quality.

It is evident from the foregoing description and examples that the practice of the present invention is subject to a great many variations and combinations, all of which use at least one stage of wire screen filter media in a continuously backwashable strainer unit in a filtration system effective in the filtration of viscose. It is further evident that filtration systems similar to those disclosed herein will have application to the filtration of other viscouse materials containing a relatively small proportion of small particulate matter which is necessarily or advantageously removed during processing. It is still further evident that use of the viscose filtration sequences disclosed herein can minimize the problems of viscose filtration to such an extent that manufacturers of chemical cellulose for use in the production of viscose can concentrate on other aspects of chemical cellulose improvement than filtration.

Having described the novel features and critical nature of screen filter media as applied to the filtration of viscose and similar viscous cellulose containing solutions intended for the manufacture of shaped articles by extrusion, an exclusive property or privilege is claimed in the embodiments of the present invention, defined as follows:

1. In the process of manufacturing rayon fibers and films by extrusion through viscose extrusion orifices, wherein viscose is filtered to remove fiber and gel particles therefrom, the improved viscose filtration sequence which is effected prior to extrusion of the viscose and which comprises filtering the viscose through at least one backwashable filter clothed with a foraminous filter media, backwashing said filter media with a minor portion of the filtered viscose at least to the extent that the pressure differential across said filter media does not exceed a predetermined level, deriving the backwashing pressure differential across said filter media and the particulate material deposited thereon from the pressure of the filtered viscose and independently regulating the backwashing pressure differential across said filter media together with the particulate matter deposited thereon with respect to the pressure differential employed in the initial viscose filtration, whereby the extruded product quality is maintained and the viscose extrusion orifices remain open.

2. The improved viscose filtration sequence of claim 1 wherein the minor portion of the filtered viscose used to backwash the foraminous filter media is returned to cellulose xanthate dissolving for subsequent refiltering.

3. The improved viscose filtration sequence of claim 1 wherein a small amount of carbon bisulfide is added to the minor portion of the filtered viscose used to backwash the foraminous filter media and said filtered viscose is returned to a retaining tank prior to subsequent refiltering.

4. The improved viscose filtration sequence of claim 1 wherein the minor portion of the filtered viscose used to backwash the foraminous filter media is filtered through a backwashable filter clothed with a foraminous filter media.

5. In the process of manufacturing rayon fibers and films by extrusion through viscose extrusion orifices, wherein viscose is filtered to remove fiber and gel particles therefrom, the improved viscose filtration sequence which is effected prior to extrusion of the viscose and which comprises filtering the viscose through at least one continuously backwashable filter clothed with a foraminous filter media, backwashing said filter media with a minor portion of the filtered viscose at least to the extent that the pressure differential across said filter media does not exceed a predetermined level, deriving the backwashing pressure differential across said filter media and the particulate material deposited thereon from the pressure of the filtered viscose and independently regulating the backwashing pressure differential across said filter media together with the particulate matter deposited thereon with respect to the pressure differential employed in the initial viscose filtration, whereby the extruded product quality is maintainned and the viscose extrusion orifices remain open.

6. The improved viscose filtration sequence of claim 5, wherein viscose is filtered through three successive continuously backwashable filters respectively clothed with foraminous filter media consisting of stainless steel wire screen filter media having minimum mesh frequencies of 200, 400 and 400 meshes per inch, together with maximum respective screen opening dimensions of 74 microns, 36 microns and 36 microns.

7. The improved viscose filtration sequence of claim 5, wherein viscose is filtered through two successive continuously backwashable filters respectively clothed with foraminous filter media consisting of stainless steel wire screen filter media having minimum mesh frequencies of 325 and 500 meshes per inch, together with maximum respective screen opening dimensions of 44 microns and 28 microns.

8. The improved viscose filtration sequence of claim 5, wherein viscose is filtered through one continuously backwashable filter clothed with a foraminous filter media consisting of a stainless steel wire screen filter media having a minimum mesh frequency of 550 meshes per inch and a maximum screen opening dimension of 26 microns.

9. In the process of manufacturing rayon fibers and films by extrusion through viscose extrusion orifices, wherein viscose is filtered to removed fiber and gel particles therefrom, the improved viscose filtration sequence which is effected prior to extrusion of the viscose and which comprises filtering the viscose through a continuously backwashable filter clothed with a stainless steel wire screen filter media having a minimum mesh frequency of 500 together with a maximum screen opening dimension of 28 microns, backwashing said filter media with a minor portion of the filtered viscose at least to the extent that the pressure differential across said filter media does not exceed a predetermined level, deriving the backwashing pressure differential across said filter media and the particulate material deposited thereon from the pressure of the filtered viscose, independently regulating the backwashing pressure differential across said filter media together with the particulate matter deposited thereon with respect to the pressure differential employed in the initial viscose filtration, diluting said minor portion of the filtered viscose with aqueous sodium hydroxide, and filtering said diluted minor portion of the filtered viscose through a continuously backwashable filter clothed with a stainless steel wire filter media having a minimum mesh frequency of 500 together with mesh openings having a maximum dimension of 28 microns, whereby the extruded product quality is maintained and the viscose extrusion orifices remain open.

10. In the process of manufacturing rayon fibers and films by extrusion through viscose extrusion orifices, wherein viscose is filtered to remove fiber and gel particles therefrom, the improved viscose filtration sequence which is effected prior to extrusion of the viscose and which comprises circulating the viscose from a retaining tank prior to ripening and deaerating, filtering the circulated viscose through a first continuously backwashable filter clothed with a foraminous filter media, returning the filtered viscose to said retaining tank, and thereafter filtering the viscose from said retaining tank through a second continuously backwashable filter clothed with a foraminous filter media, backwashing each of said filter media with a minor portion of the filtered viscose at least to the extent that the pressure differential across each of said filter media does not exceed a predetermined level, deriving the backwashing pressure differential across each of said filter media and the particulate material deposited thereon from the pressure of the filtered viscose and independently regulating the backwashing pressure differential across each of said filter media and the particulate material deposited thereon with respect to the pressure differential employed in the initial viscose filtrations, whereby the extruded product quality is maintained and the viscose extrusion orifices remain open.

11. The improved viscose filtration sequence of claim 10, wherein the first continuously backwashable filter is clothed with a stainless steel wire screen filter media having a minimum mesh frequency of 325 meshes per inch and a maximum screen opening dimension of 44 microns, and the second continuously backwashable filter is clothed with a stainless steel wire screen filter media having a minimum mesh frequency of 500 meshes per inch and a maximum screen opening dimension of 28 microns.

12. In the process of manufacturing rayon fibers and films by extrusion through viscose extrusion orifices, wherein viscose is filtered to remove fiber and gel particles therefrom, the improved viscose filtration sequence which comprises filtering the viscose prior to extrusion through at least one continuously backwashable filter clothed with a stainless steel wire screen filter media wherein the filtered viscose is used as the backwashing media, the backwashing pressure is derived from the pressure of the filtered viscose and the backwashing pressure differential across the stainless steel wire screen filter media and the particulate material deposited thereon is independently regulated with respect to the pressure differential employed in the initial viscose filtration, said continuously backwashable filter being placed in series with and prior to at least one conventionally clothed plate and frame filter press, whereby the extruded product quality is maintained and the viscose extrusion orifices remain open.

13. The improved viscose filtration sequence of claim 12, wherein viscose is filtered through a continuously backwashable filter clothed with a stainless steel wire screen filter media having a minimum mesh frequency of 200 meshes per inch and a maximum screen opening dimension of 74 microns, said continuously backwashable filter being placed in series with and prior to three successive conventionally clothed plate and frame filter presses.

14. The improved viscose filtration sequence of claim 12, wherein viscose is filtered through a continuously backwashable filter clothed with a stainless steel wire screen filter media having a minimum mesh frequency of 200 meshes per inch and a maximum screen opening dimension of 74 microns, said continuously backwashable filter being placed in series with and prior to two successive conventionally clothed plate and frame filter presses.

15. The improved viscose filtration sequence of claim 12, wherein viscose is filtered through a continuously backwashable filter clothed with a stainless steel wire screen filter media having a minimum mesh frequency of 325 meshes per inch and a maximum screen opening dimension of 44 microns, said continuously backwashable filter being placed in series with and prior to two successive conventionally clothed plate and frame filter presses, whereby the service life of the conventional filter media used to clothe said plate and frame filter presses is substantially increased.

16. The improved viscose filtration sequence of claim 12, wherein viscose is filtered through two successive continuously backwashable filters clothed with sainless steel wire screen filter media having respective minimum mesh frequencies of 200 and 325 meshes per inch, together with maximum respective screen opening dimensions of 74 and 44 microns, said continuously backwashable filters being placed in series with and prior to a conventionally clothed plate and frame filter press.

References Cited

UNITED STATES PATENTS

| | | | |
|---|---|---|---|
| 2,066,479 | 1/1937 | MacIsaac | 210—415 X |
| 2,087,016 | 7/1937 | Bradshaw et al. | 264—188 X |
| 2,184,177 | 12/1939 | Burrell | 210—108 X |
| 2,204,349 | 6/1940 | Forrest | 210—76 |
| 2,513,795 | 7/1950 | Gliss | 210—415 X |
| 2,820,985 | 1/1958 | Cresswell | 210—489 X |
| 2,838,084 | 6/1958 | Samler | 210—107 X |
| 2,869,176 | 1/1959 | Wright. | |
| 3,146,494 | 9/1964 | Sponaugle | 210—411 X |

FOREIGN PATENTS 672,320   10/1963   Canada.

REUBEN FRIEDMAN, *Primary Examiner.*

SAMIH N. ZAHARNA, *Examiner.*

D. M. RIESS, J. ADEE, *Assistant Examiners.*